Figure 1:
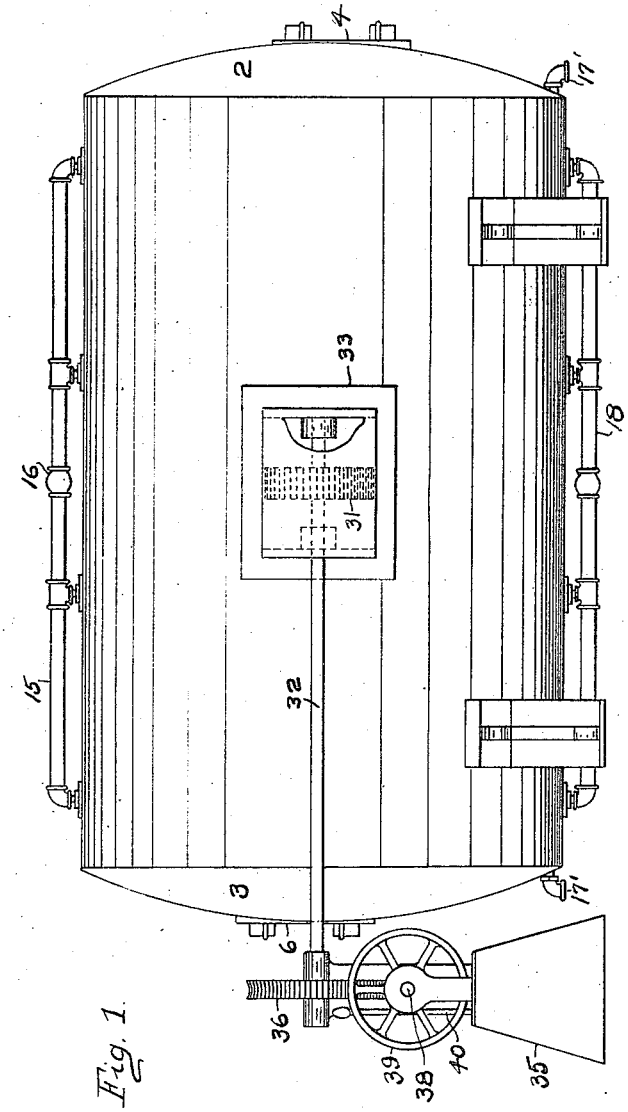

G. BENGS.
STERILIZING APPARATUS.
APPLICATION FILED NOV. 28, 1908.

999,294.

Patented Aug. 1, 1911.
3 SHEETS—SHEET 1.

WITNESSES:
Isaac N. Taylor
Helen F. Glenn

INVENTOR
Gustav Bengs
BY
Elwin N. Hulse
ATTORNEY

G. BENGS.
STERILIZING APPARATUS.
APPLICATION FILED NOV. 28, 1908.
999,294.
Patented Aug. 1, 1911.
3 SHEETS—SHEET 2.
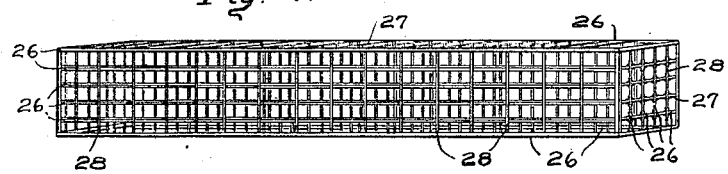
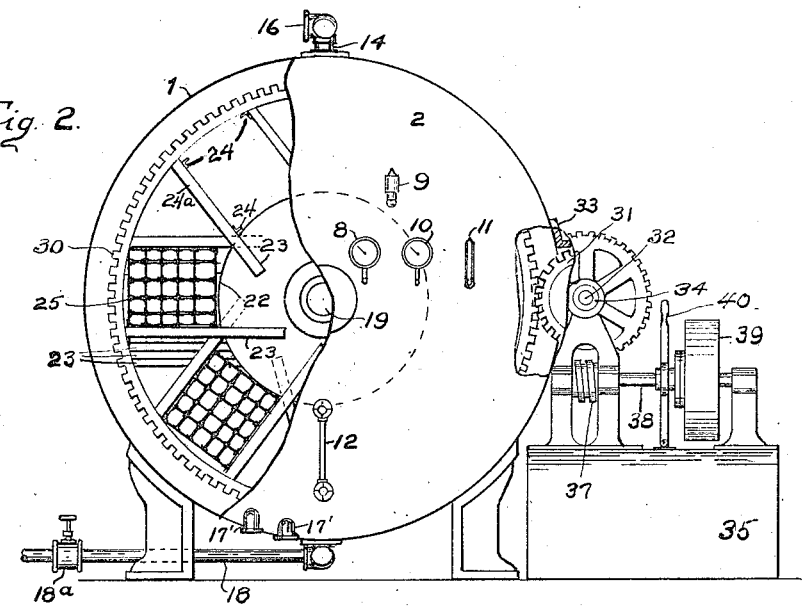
WITNESSES:
Isaac M. Taylor
Helen F. Glenn
INVENTOR
Gustav Bengs
BY
Elwin M. Hulse
ATTORNEY

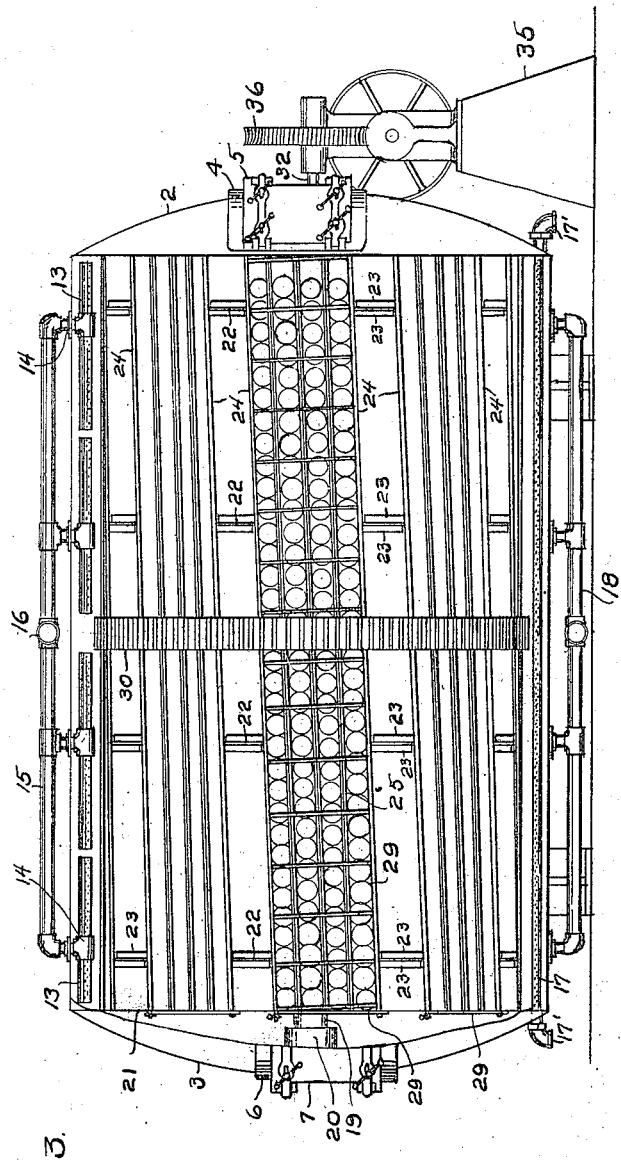

UNITED STATES PATENT OFFICE.

GUSTAV BENGS, OF FORT WAYNE, INDIANA.

STERILIZING APPARATUS.

999,294.

Specification of Letters Patent.   Patented Aug. 1, 1911.

Application filed November 28, 1908.   Serial No. 464,841.

*To all whom it may concern:*

Be it known that I, GUSTAV BENGS, a citizen of the United States, residing at Fort Wayne, in the county of Allen and State of Indiana, have invented certain new and useful Improvements in Sterilizing Apparatus, of which the following is a specification.

My invention relates to apparatus for sterilizing various fluids and particularly to apparatus by which milk, cream and the like, may be sterilized.

In the preparation of condensed or evaporated milk or cream for the market the milk or cream is first relieved of most of its water, then sealed up in cans and then sterilized while in the sealed cans, by subjecting the cans and contents to heat and cold. Heretofore it has been the practice to pack the filled cans in metallic boxes. The filled boxes are then placed within a rotating receptacle into which steam is turned until a predetermined temperature is reached, at which time the steam is turned off and water turned in to cool the contents. This operation has its disadvantages. The boxes when filled are heavy and cumbersome to handle and considerable time is consumed in filling and unloading the cans as well as in placing the filled boxes into the rotating receptacle and removing them therefrom. Furthermore, since the cans are inclosed in those metallic boxes it is impossible to heat the contents of the cans in a uniform manner. The boxes must first be heated, and the cans lying next to the surface of each box become the hottest, while those in the center are coolest at a given temperature for the interior of the rotating receptacle. In cooling the contents the same situation arises—the box must be cooled first, and the cans next to the same become the coolest while those at the center remain at a higher temperature. It is impossible in such arrangements to heat and cool all the cans alike; hence a uniform sterilization of the contents of all the cans which are being treated is impossible, the result being that the apparatus turns out a product, part of which is sufficiently sterilized and part insufficiently sterilized. It is therefore very desirable to have a sterilizing means by which the product thereof shall be sterilized in a uniform manner with the least labor possible to the operator and do the work in a short space of time.

The object of my invention is to provide an apparatus in which milk or cream, which has been relieved of its water, may be economically and uniformly sterilized; and it consists of a skeleton frame carrying angularly disposed crates which are adapted to receive and retain a plurality of milk and cream receptacles, the skeleton frame being mounted to rotate in the presence of steam or water within a casing or shell in such manner that all the receptacles shall directly come in contact with the steam or water.

In the drawings I illustrate the preferred form of construction embodying my invention, in which—

Figure 1 is an elevational view of the device; Fig. 2 an end view of the same with the end plate partially broken away to show the interior; Fig. 3 an elevational view of the same with the shell or casing removed and Fig. 4 a view of the crate or container.

Similar numerals refer to like parts throughout the drawings.

Referring to the drawings I provide an outer shell or drum 1 which is preferably cylindrical in form, the ends being closed by end plates 2 and 3, all joints being made fluid tight. In end plate 2 I provide a suitable man hole 4 which is closed by cover 5. A similar manhole 6 and cover 7 are provided in end plate 3. At suitable points in shell 1 I provide a suitable steam gage 8, a pop valve 9, a vacuum gage 10, a thermometer 11 and a water gage 12. In the upper portion of the shell I provide a water spray comprising one or more perforated pipes 13, which are connected with connections 14 to a pipe 15, connections 14 passing through shell 1. Connection 16 in pipe 15 is adapted to receive a pipe or other water line which leads from a suitable water supply. In the lower portion of shell 1 I provide one or more perforated steam pipes 17, one end of each of which passes through the shell to the outside where it is connected to a suitable steam supply at 17'. A suitable waste pipe 18 having a valve 18ª communicates with the lower portion of shell 1 to carry off the water which enters the shell through sprays 13.

A shaft 19 extends longitudinally within shell 1 and is suitably supported by bearings 20 in each end plate. Mounted on this shaft is a skeleton frame 21 comprising a series of similar circular plates 22, which are suitably fixed on shaft 19. Each plate is provided with a plurality of strips or bars 23, which project outwardly beyond the periphery of the plate and are arranged thereon in parallel pairs. A pair of bars 23 on each plate 22 is in longitudinal alinement with a pair of such bars on each of the other plates, and each set of such alined pairs of bars 23 form supports to which are attached four parallel and longitudinally extending angle bars 24, the angle bars being mounted on bars 23 so that the angle of each bar 24 opens inwardly. Angle bars 24 as thus mounted on each set of bars 23 form supporting or retaining frames 24ª, which are adapted to receive and support crates or containers 25. These crates consist of a plurality of longitudinally extending runways or channels which are formed by angle bars 26, cross strips 27 and upright bars 28, the several angle bars 26 being arranged or spaced apart on the cross and upright bars to form runways which open from end to end of the crate into which milk receptacles 29 may be inserted. The receptacles are usually cylindrical in form and for my purposes I prefer to insert them into the runways on their curved surfaces, as will be explained hereinafter. It is therefore necessary to construct the runways of sufficient size as to their transverse cross section to freely receive and retain the receptacles which contain the goods to be sterilized. Any convenient number of runways may be provided in the crates and if it should be so desired a crate may be permanently fixed to skeleton frame 21. The main advantage in having the crates removable from the skeleton frame is to enable the operator to insert crates which will receive and retain receptacles of different sizes.

The supporting frames 24ª are disposed on skeleton frame 21 in such a manner that a crate which may be within one of the supporting frames will be held to the periphery of the several plates 22 on an angle with respect to their longitudinal axis. Since plates 22 are of the same diameter none of the crates tapers in its position toward shaft 19, but is in a plane parallel to the plane of said shaft. This angularity is accomplished by mounting the sets of alined pairs of bars 23 on plates 22 in such a manner that the successive pairs of those bars from the front plate to the rear plate shall circumferentially lag behind the pair in front of it, such lagging being the same for all the pairs in the several sets of bars 23. Since the lag of each pair of bars 23 behind the pair on the plate in front of it is the same the bars forming a set are in alinement and are adapted to serve as supports for angle bars 26 which are straight. This angularity which I provide for supporting frames 24ª and their crates 25 enables each crate to have its front end elevated above the rear end during part of its revolution, and the rear end elevated above the front end during another part of its revolution. In the drawings Fig. 3, I show crates 25 as inclined from front to rear; if the motion of frame 21 is from left to right, Fig. 2, therefore as crate 25 rises the front end is higher than the rear end while as the crate descends on the other side of skeleton frame 21 the rear end is higher than the front end. Such a change of inclination or angularity is evident from the manner in which the crate is held to the skeleton frame 21. Each crate acts in the same way as frame 21 is revolved. The purpose of this change of inclination of the crate is to give a to and fro motion to the milk receptacles 25. Since these receptacles are placed in the runways of the crate on their curved surfaces they will tend to roll back and forth in those runways as the inclination of the crate changes. It is evident that the receptacles must not be crowded into the runways so as to prevent the to and fro motion of those receptacles.

Manholes 4 and 6 are arranged in end plates 2 and 3 so as to register with the front and rear ends of a crate respectively when that crate is in the position of its front end being elevated above its rear end. By this arrangement of the manholes gravity will enable the operator to load the crate with the milk receptacles, the latter rolling down the runways to fill the same, and also in emptying the runways of the receptacles after the sterilizing operation is completed. A gate or door 29 is mounted on skeleton frame 21 at each end of each supporting frame 24ª, which is adapted to close that end of each frame 24ª and thus prevent the escape of the milk receptacles from the ends of the crate within such frame. Gate 29 on the rear end of each frame 24ª is adapted to be let down into manhole 6, thereby releasing the milk receptacles from the crate and providing a means by which the milk receptacles may be led from the crate out through the manhole to the outside.

A toothed member 30 surrounds and is mounted on the skeleton frame 21 in any suitable manner, and is adapted to mesh with gear 31 which is mounted on shaft 32. A suitable stuffing box 33 is mounted on shell 1 and incloses gear 31 and a portion of shaft 32, and forms a bearing for that shaft, the other end of the shaft being supported in bearing 34 which is mounted on pedestal 35. On the outer end of shaft 32 is a worm gear 36 which meshes with a worm 37 mounted on shaft 38 which shaft is suitably supported on pedestal 35, shaft 32 also carrying a pulley 39 and friction clutch 40 to which pulley power is applied to drive the several gears and the skeleton frame.

In operation manhole 4 is uncovered and skeleton frame 21 is rotated until the end of one of the supporting frames 24ª registers with that manhole; then a container or crate 25 is slid into said frame (in case the crate is not permanently fixed to the frame) and the several divisions or runways of that container are filled with receptacles containing the material to be sterilized, the gate or door 29 at the rear end of the container being closed. Skeleton frame 21 is then rotated until the front end of the next supporting frame registers with manhole 4; a container is placed in that frame and filled with the milk receptacles, and so on until all or as many of the supporting frames as is desired shall be provided with crates and receptacles. Steam is turned on through pipes 17 and power is applied to pulley 39 to drive the skeleton frame 21 with its burden of receptacles through the steam which fills all parts of shell 1. When the temperature within the shell has risen to the desired point as indicated by thermometer 11 the supply of steam is cut off from entering steam pipe or pipes 17 by any suitable means, and water is turned into the sprays 13. By means of perforated pipes 13 the water is sprayed over the rotating milk receptacles and falls to the lower portion of the shell where it accumulates, (valve 18ª being closed) until water gage 12 indicates that the water has risen in the shell to a height sufficient to cover the contents of a crate when that crate is in the lowermost position of its revolution. When the desired low temperature, as indicated by thermometer 11, has been reached, the water supply is cut off, the rotation of the revolving structure is stopped by use of clutch 40 or the shutting down of the power. Cover 7 is opened and, if it should be necessary, skeleton frame 21 is rotated until the rear end of one of the crates registers with manhole 6. Gate 29 is let down into manhole 6 which permits the receptacles to roll out of the crate onto the gate and to the outside through the manhole where they may be collected in any convenient manner. The rear end of another crate is brought into registry with manhole 6, its gate opened and its receptacles permitted to roll out as before, the operation being continued until all the receptacles are removed from the crates. After all the water has passed out through waste pipe 18 and the crates are empty the device is ready for another complete operation.

The crates 25 and supporting frames 24ª being formed of spaced bars, leave a considerable portion of each milk receptacle exposed to the steam and water; and since the crates are angularly disposed on the rotating frame 21 and their inclination changes as they are rotated, the receptacles will take on a to and fro motion within the several crates, thereby exposing all parts of each receptacle to the steam and water.

It is apparent that by admitting the steam and water into shell 1 through perforated pipes a uniform distribution of both takes place within the shell, and by having each milk receptacle individually exposed to that steam or water each receptacle receives the same degree of heat and cold, thereby producing a uniform product as a result of the operation of the device. By my device I am, therefore, able to uniformly heat and cool the contents of all the receptacles which are placed in the same for sterilization and thereby produce a product which has been uniformly sterilized. I am also able to make a large saving in time and labor in the handling of the receptacles, particularly in loading and unloading the machine.

It is apparent that my invention is available for use in connection with the sterilization of any material which it is desired to rotate in the presence of heat and cold. Many modifications are possible, but I have shown and described the preferred form and manner in which my invention may be carried out in practice.

What I claim is:

1. A sterilizing apparatus comprising an outer shell provided with a heating and cooling supply, a frame revolubly mounted within the shell and having means thereon to support a food receptacle, said means being arranged longitudinally of the frame and diagonally relative to the path of motion of the same, and means to rotate the frame.

2. A sterilizing apparatus comprising an outer shell having connected thereto a heating and cooling supply, a frame revolubly mounted therein, a crate supported on the frame longitudinally of the latter and diagonally relative to its path of motion, and means to rotate the frame.

3. In a sterilizing apparatus the combination of a shell and means connected thereto to heat and cool the interior thereof, of a frame revolubly mounted within the shell, a plurality of food receptacle supports arranged on the frame longitudinally of its length and diagonally to the path of its motion, and means to rotate the frame.

4. In a sterilizing apparatus the combination with an outer shell having doors arranged in opposite ends thereof in different horizontal planes, a frame revolubly mounted within the shell and carrying a plurality of receptacle supports which are arranged thereon longitudinally of the frame and diagonally relative to the path of motion of said frame, and means to rotate the frame.

5. In a sterilizing apparatus the combination of a revoluble frame having a receptacle support arranged thereon longitudinally of the frame and diagonally relative to the path of motion of the frame, means to rotate the frame and means to heat and cool the receptacles.

6. In a sterilizing apparatus the combination of an outer shell, a frame revolubly mounted within the shell and carrying a plurality of removable receptacle supports, the supports being arranged longitudinally of the frame and diagonally relative to the path of motion of the same.

7. In a sterilizing apparatus comprising an outer shell, having doors arranged in its opposite ends in different horizontal planes, a frame revolubly mounted within the shell, a food receptacle support carried by the frame, one extremity of which, when the frame is at rest will be adjacent one door and the other extremity adjacent the other door whereby the food receptacle is inserted into the support through the upper door and after treatment is discharged by gravity through the other door.

In witness whereof, I hereunto subscribe my name in the presence of two witnesses.

GUSTAV BENGS.

Witnesses:
ELWIN M. HULSE,
HELEN F. GLENN.